Patented Sept. 27, 1932

1,880,036

UNITED STATES PATENT OFFICE

EVERETT W. LOVERING, OF BERLIN, NEW HAMPSHIRE, ASSIGNOR TO BROWN COMPANY, OF BERLIN, NEW HAMPSHIRE, A CORPORATION OF MAINE

COMPOSITION OF MATTER AND PROCESS OF MAKING THE SAME

No Drawing.    Application filed December 12, 1928.    Serial No. 325,651.

This invention relates to a composition of matter, and more particularly one intended for use in coating articles to render them waterproof. There are certain articles such as those made of cellulosic pulp, which tend to disintegrate when exposed to the action of water. In order to prevent such disintegration, it is sometimes the custom to impregnate the fibrous articles with waterproofing materials such as pitch. An example of articles of this type are fibrous tubes or conduits made, for example, by winding a web of wet pulp or paper on a mandrel to the desired thickness, then removing the tube from the mandrel and drying it. A tube thus formed is composed of layers of interfelted fiber compactly matted together and forming a comparatively rigid, dense wall structure. Such tubes are customarily employed for housing electric cables in underground systems where they are exposed to the action of moisture and are frequently used as pipes for conducting water or aqueous liquors, under which conditions they must be protected from disintegration. This is accomplished by impregnating the tubes with waterproofing material such as pitch, which not only renders them resistant to deterioration by the action of water, but increases their strength and rigidity. It has been found, however, that it is difficult to incorporate sufficient pitch into the dense tube wall to afford satisfactory protection when such tubes are used, for example, as pipes for conducting water, acid liquors, or the like. In such case, it has been the practice to apply a coating composition to the surface of the impregnated tube, a composition suitable for this purpose comprising blown asphalt which is a tough, rubbery solid under atmospheric temperature conditions. A coating composition comprising blown asphalt, in order to be suitable for the purposes desired, must answer certain requirements among which are the following, to wit:

(1) The composition should be convertible by heat into a liquid thin enough to produce an even coating when tubing is dipped thereinto at a temperature which will not char the cellulose fibers.

(2) The composition should congeal or harden at ordinary temperatures and yet not be soft or sticky at temperatures of, say, 100° to 140° F., which is sometimes attained by black bodies exposed to the direct rays of the sun.

(3) The composition should remain tough and rubbery at low temperatures such as experienced during the winter time.

It has heretofore been difficult to produce coating compositions which fulfill all the requirements hereinbefore indicated. Blown asphalt alone is not suitable, as this material may be more or less sticky at or above room temperature, and may be quite brittle at freezing or lower temperatures such as experienced during the winter.

By adding certain agents to such asphalt, it has been found that its characteristics may be so modified as to improve its suitability for the purposes desired. For example, as described in application Serial No. 133,517, filed September 3, 1926, by Wallace B. VanArsdel, paraffin may be added to molten asphalt in sufficient amount to lower the viscosity of the melt to a point whereat a satisfactory coating may be produced on the tubing at a temperature which will not char the cellulose fibers. The paraffin further serves to impart a waxy consistency to the asphalt, so that when the composition is allowed to congeal or harden at ordinary temperature, it is non-sticky and wax-like. As further disclosed in that application, finely divided inert material such as bentonite, fuller's earth, slate dust, or the like, may be added to the melt for the purpose of increasing the stability or hardness of the coating at temperatures of, say, 100° to 140° F.

While a composition such as described in that application overcomes certain of the difficulties mentioned, it has been found that the coating may be fractured under impact, particularly at freezing temperatures such as experienced during the winter. This is a serious matter, as it has been found that during the handling and shipping of such tubes, flakes or chips of coating may break off from the tubes and expose the imperfectly impregnated fibrous structure, thus rendering the tubes liable to deterioration by the action of water where flaking or chipping has occurred.

The object of the present invention is to produce a coating composition which possesses all the characteristics hereinbefore indicated as desirable for compositions of this type. I have found that such a composition may be prepared by mixing suitable proportions of blown petroleum asphalt, rubber, and a waxy material. Generally stated, a suitable composition comprises a preponderant proportion of asphalt, a much lesser proportion of rubber, and a still lesser proportion of waxy materials. The following are compositions which have been found satisfactory:

|  | 1 | 2 | 3 |
|---|---|---|---|
|  | Per cent | Per cent | Per cent |
| Blown petroleum asphalt | 80 | 85 | 90 |
| Crepe rubber | 15 | 10 | 5 |
| Waxy material | 5 | 5 | 5 |

The preferred composition lies between compositions Nos. 2 and 3, though it has been found that any composition between No. 1 and No. 3 is satisfactory.

The blown petroleum asphalt used as a raw material is preferably one having a melting point of about 235° to 250° F., although harder blown asphalts having higher melting points, or softer blown asphalts having lower melting points, say as low as 150° F., may be employed. The waxy material used is preferably one which is a true chemical wax, that is, constitutes a fatty acid ester of a higher alcohol, or a mixture of such esters, as such material has been found to be miscible with petroleum asphalt and to give a composition which has the best characteristics. Beeswax serves well for this purpose, being quite tough while cold, facilitating the solution of the rubber, and rendering the composition more fluid at 300° to 450° F., at which temperatures the composition may be employed for coating the tubing. Other waxy materials, however, such as dehydrated wool grease or lanolin, may be used, or even waxy materials of the nature of candelilla and spermaceti, although in such latter case the viscosity of the melted composition is somewhat higher than when beeswax is used. Mixtures of beeswax and wool grease or other waxes may be used. Paraffin, Montan wax, Ozokerite, or other mineral waxes may be used to replace a part of the true waxes, but the proportion in the mixture should be kept low. It is preferable to employ crepe rubber as a raw material, as such rubber imparts high impact resistance to the composition at freezing temperatures, but rubberlike bodies such as natural or artifical gums (e. g., chicle, "aroban", and "Elastica") may be used. Reclaimed rubber or lightly cured, vulcanized rubber may be used instead of crepe rubber, but at the expense of elasticity when the mixture is cold.

The composition may be prepared substantially as follows. The desired proportions of asphalt and rubber may be placed in a mixer of any suitable type, e. g., a roll mill or Werner and Pfleiderer or Banbury mixer, the mixer being provided with a steam jacket or other suitable heating means. The mixture is then heated until it has been softened, whereupon the mixtre may be set in operation and the waxy material added so as to lower the temperature necessary to effect even distribution of the rubber through the mass. The mixture is then heated until the rubber or analogous material is dissolved. Heating the ingredients together without mastication will produce a smooth mixture, but longer heating and a higher temperature is then necessary.

A coating treatment with compositions produced as herein described may be carried out under pressure, if desired, to ensure appreciable penetration of the composition within the pores and interstices of the tubes. Such a procedure may be followed to advantage when the tubes have not been subjected to preliminary impregnation with waterproofing material. Or, as customarily done, the tubes may first be immersed, preferably under pressure, in a bath of waterproofing material, e. g., gas-house pitch, of sufficiently high penetrability to impregnate the fibrous structure. The impregnated tubes may then be dipped into the composition of the present invention at a temperature of, say, 300° to 450° F., under which conditions it exists as a smooth liquid composition and forms an even interior and exterior coating, which remains substantially unaffected even by the severest atmospheric temperature changes, and has a desirable glossy finish. The wax constituent of the mixture is slightly volatile at the dipping temperature and upon continued use the viscosity of the melted mixture tends to rise because of loss of wax. This tendency may be counteracted and the viscosity controlled by adding additional wax from time to time.

If desired, prior to the application of a coating with the composition of the present invention, a thin primary coating of stearin pitch may be applied to the impregnated tubes so as to increase the bond of the coating with the tube wall, and thus further lessen the likelihood of chipping or flaking of the coating during handling or transportation. I do not, however, claim that latter subject matter, as it is described and claimed in an application for patent, Serial No. 325,428, filed December 12, 1928 by Wallace B. VanArsdel and myself.

Having thus described certain embodiments of the composition of this invention, it is evident to those skilled in the art that various changes and modifications might be made therein without departing from the spirit or scope of invention as defined by the appended claims.

I claim:

1. A composition of matter comprising a preponderant proportion of previously blown petroleum asphalt, a much lesser proportion of rubber, and a still lesser proportion of waxy material.

2. A composition of matter comprising a preponderant proportion of previously blown petroleum asphalt, a much lesser proportion of rubber, and a still lesser proportion of a true chemical wax.

3. A composition of matter comprising a preponderant proportion of previously blown petroleum asphalt, a much lesser proportion of rubber, and a still lesser proportion of beeswax.

4. A composition of matter comprising about 80% to 90% previously blown petroleum asphalt, about 5% to 15% rubber, and about 5% waxy material.

5. A composition of matter comprising about 80% to 90% previously blown petroleum asphalt having a melting point of about 150° to 250° F., about 5% to 15% rubber, and about 5% of a true chemical wax.

6. A composition of matter comprising about 80% to 90% previously blown petroleum asphalt having a melting point of about 150° to 250° F., about 5% to 15% rubber, and about 5% beeswax.

7. A process which comprises masticating a preponderant proportion of previously blown petroleum asphalt along with a much lesser proportion of rubber and a still lesser proportion of waxy material under temperature conditions resulting in a soft, homogeneous mass, and then heating the mass to about 300° to 450° F. to produce a smooth, liquid composition.

In testimony whereof I have affixed my signature.

EVERETT W. LOVERING.